G. F. KNOX.
COOLER.
APPLICATION FILED DEC. 17, 1918.
1,377,692.
Patented May 10, 1921.
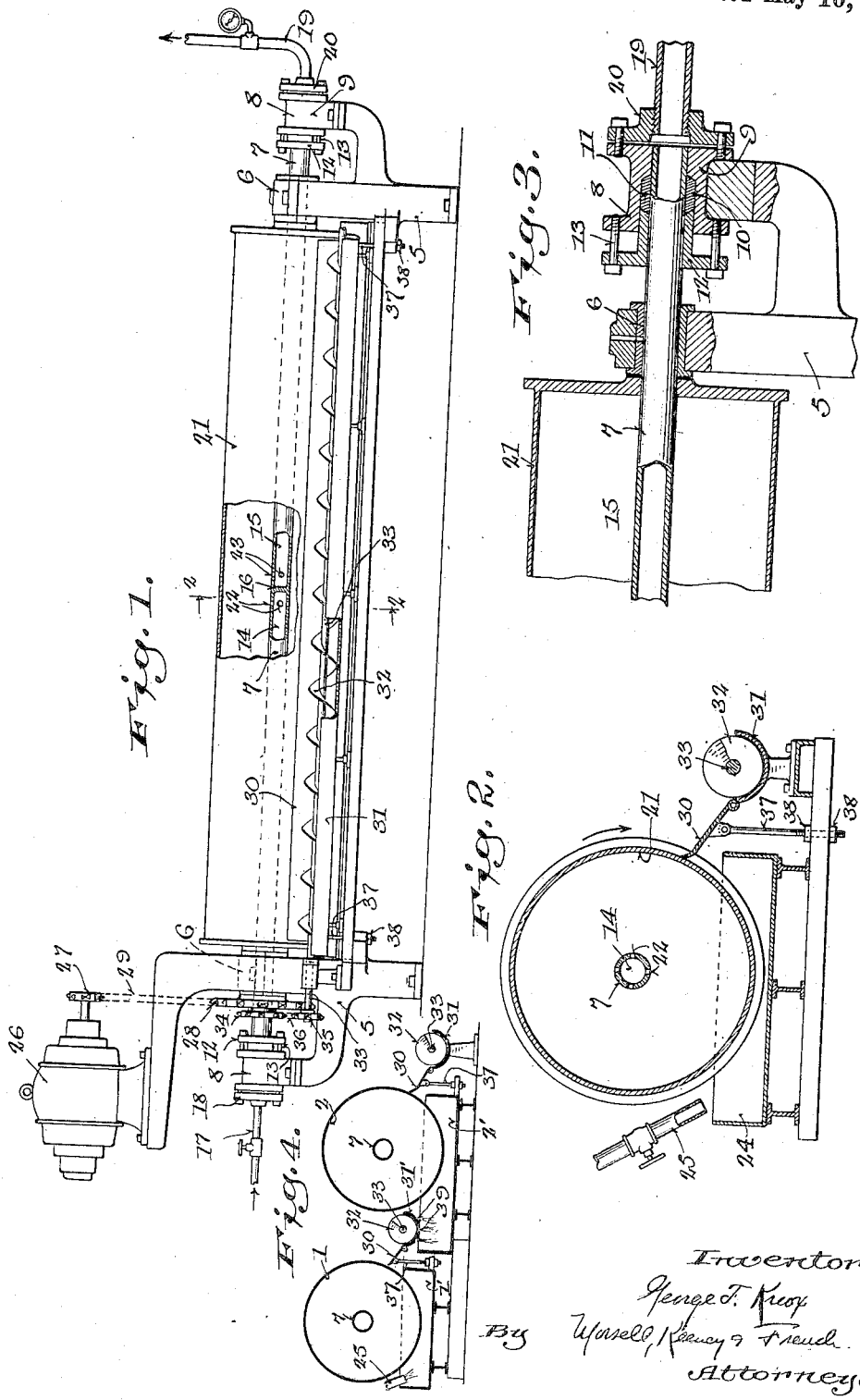

UNITED STATES PATENT OFFICE.

GEORGE F. KNOX, OF MILWAUKEE, WISCONSIN, ASSIGNOR OF ONE-HALF TO LOUIS G. BOHMRICH, OF MILWAUKEE, WISCONSIN.

COOLER.

1,377,692.      Specification of Letters Patent.      Patented May 10, 1921.

Application filed December 17, 1918. Serial No. 267,133.

*To all whom it may concern:*

Be it known that I, GEORGE F. KNOX, a citizen of the United States, and resident of Milwaukee, in the county of Milwaukee and State of Wisconsin, have invented new and useful Improvements in Coolers, of which the following is a description, reference being had to the accompanying drawings, which are a part of this specification.

The invention relates to cooling devices and more particularly for cooling semi-liquids or dense liquids such as condensed milk and cream, or for cooling paraffin so that it may be readily separated from other constituents, and is fully described and explained in the following specifications, and shown in the accompanying drawings, in which:

Figure 1 is a side view of the device embodying the invention, parts being broken away and parts being shown in section;

Fig. 2 is a section taken on the line 2—2 of Fig. 1;

Fig. 3 is a detail vertical sectional view through the end bearing and stuffing box; and Fig. 4 is a view of an arrangement for successive cooling.

In the drawings, the numeral 5 designates the frame of the machine having end journals 6 in which a shaft 7 is rotatably mounted.

The ends of this shaft rotate in stuffing boxes 8, each stuffing box consisting of a bearing member 9 provided with a bore 10 enlarged at one end to receive packing 11 held in place by a bearing plug 12 secured by bolts 13 to the member 9.

The shaft 7 is hollow at both ends and divided into two conduits 14 and 15 by a partition 16. The refrigerant is led into the conduit 14 by a pipe 17 mounted in a stuffing box cover 18 secured to the member 9 at this end of the machine. The refrigerant is conducted from the conduit 15 by means of a return pipe 19 mounted in a stuffing box cover 20 secured to the member 9 at this end of the machine.

A hollow drum 21 is mounted on and surrounds the greater portion of the shaft 7. Refrigerant is introduced into this drum through openings 22 in the conduit 14 and is discharged from the drum through openings 23 in the conduit 15.

With the construction thus far described, the refrigerant proceeds through pipe 17, conduit 14 and openings 22 into the drum, cooling the surface of the drum by direct expansion of the refrigerant within the drum and returns through openings 23, conduit 15 and pipe 19. This is the preferred manner of cooling the drum, but I am aware that said drum may be cooled by circulating a cooling medium such as brine through it to cool its surface.

The lower side of the drum 21 dips into a tank 24 containing the substance to be cooled, this substance being fed into the tank in any suitable manner as through a pipe 25. The drum is continuously rotated by a motor 26 drivingly connected to the shaft 7 through sprockets 27 and 28 and a chain 29. As the drum revolves a portion of the semi-liquid or paraffin in the tank 24 will adhere to the surface of the drum and be carried up on the surface of the drum and during its revolution the cool surface of the drum will cool this portion which adheres to it and solidify it. The cooled solidified material is then removed from the drum by means of a scraper 30 and passes into a trough 31, from which it is carried off by any suitable conveyer, such as an endless screw conveyer 32, the shaft 33 of which is driven from the shaft 7 by a sprocket 34 on shaft 7 connected to a sprocket 35 on the shaft 33 by a chain 36. The scraper 30 is pivotally connected to the inner side of the trough and bears against and may be set near to the side of the drum as shown in Fig. 2. The scraper is held in adjusted position by means of bolts 37 pivotally connected at their upper end to the scraper and adjustably secured at the lower ends in the frame 5 by means of nuts 38.

In Fig. 4 I have shown a pair of cooling drums each similar to that previously described and each dipping into its tank and have designated the upper drum and tank as 1 and 1', and the lower drum and tank as 2 and 2'. The solidified material on drum 1 is removed by the scraper 30 and passes into a trough 31' which has perforations 39 in its bottom so that the unsolidified part of the mixture removed from drum 1 drains down through said perforations into tank 2 while the solidified material is carried off by the conveyer 32. The material which drops into tank 2 is then carried up on drum 2 and cooled and removed by the scraper 30, trough 31 and conveyer 32 for this drum. While I have only shown two drums with the provision for successive cooling of the material, it will be understood that the material may be cooled in as many stages as desired by the use of a suitable number of cooling devices in which the unsolidified material is conveyed from one cooling device to another. By this manner of successive cooling when applied to paraffin different grades of paraffin may be separated from each other because of the different temperatures required to cool these different grades.

The use of this machine results in very efficient cooling, as a thin layer of the substance to be cooled is in contact with the cooled surface of the drum for a considerable time and the use of stirrers is entirely obviated.

While I prefer to use a revolving drum, I am aware that a similar cooling effect might be had by otherwise moving a hollow cooling member, said member having a large cooling surface.

What I claim as my invention is:

1. In a cooling device, the combination of a plurality of revolving drums, means for cooling the drums, means for bringing the substance to be cooled in contact with one of the drums, means for removing the material from this drum and separating the cooled from the uncooled material and means for bringing the uncooled material from the first drum into contact with the second drum, and means for removing the material from the second drum.

2. In a cooling device, the combination of a plurality of revolving drums, means for cooling the drums, means for bringing the substance to be cooled into contact with one of the drums, means for removing the material from this drum and separating the cooled material from the uncooled material, means for bringing the uncooled material from the first drum into contact with another drum of the plurality, and means for removing the material from said other drum of the plurality whereby the substance will be successively cooled by said device and whereby different grades of substance may be separated from each other.

In testimony whereof I affix my signature.

GEORGE F. KNOX.